United States Patent [19]
Sullivan

[11] 3,939,084
[45] Feb. 17, 1976

[54] FUNCTIONAL FLUID COMPOSITIONS CONTAINING SUBSTITUTED PYRIMIDINES

[75] Inventor: James D. Sullivan, Chesterfield, Mo.
[73] Assignee: Monsanto Company, St. Louis, Mo.
[22] Filed: Dec. 28, 1973
[21] Appl. No.: 429,451

Related U.S. Application Data

[63] Continuation of Ser. No. 316,159, Dec. 18, 1972, abandoned, which is a continuation of Ser. No. 156,133, June 23, 1971, Pat. No. 3,759,829, which is a continuation-in-part of Ser. No. 796,885, Feb. 5, 1969, Pat. No. 3,591,500, which is a continuation-in-part of Ser. No. 540,488, April 6, 1966, abandoned.

[52] U.S. Cl. .................. 252/47.5; 252/50; 252/77; 252/391
[51] Int. Cl. ............................................. C10m 3/32
[58] Field of Search................... 252/47.5, 50, 77

[56] References Cited
UNITED STATES PATENTS
3,759,829   9/1973   Sullivan ............................ 252/47.5

*Primary Examiner*—Delbert E. Gantz
*Assistant Examiner*—Andrew H. Metz
*Attorney, Agent, or Firm*—Herbert B. Roberts

[57] ABSTRACT

Functional fluid compositions comprising polyphenyl thioethers, mixed polyphenyl oxy-thioethers and mixtures thereof containing certain pyrimidines as anti-corrosive agents have improved metal compatibility and are particularly useful as aircraft engine lubricants and hydraulic fluids.

2 Claims, No Drawings

FUNCTIONAL FLUID COMPOSITIONS CONTAINING SUBSTITUTED PYRIMIDINES

This application is a continuation of Ser. No. 316,159 filed Dec. 18, 1972 and now abandoned, which is a continuation of Ser. No. 156,133 filed June 23, 1971 and now U.S. Pat. No. 3,759,829, which is a continuation - in - part of application Ser. No. 796,885, filed Feb. 5, 1969 and now U.S. Pat. No. 3,591,500, which is a continuation - in - part of Ser. No. 540,488, filed Apr. 6, 1966 and now abandoned.

This invention relates to functional fluid compositions having improved metal compatibility and more particularly to functional fluids containing certain organic nitrogen compounds.

Many different types of materials are utilized as functional fluids and functional fluids are used in many different types of applications. Such fluids have been used as electronic coolants, atomic reactor coolants, diffusion pump fluids, synthetic lubricants, damping fluids, bases for greases, force transmission fluids (hydraulic fluids) and as filter mediums for air-conditioning systems. Because of the wide variety of applications and the varied conditions under which functional fluids are utilized, the properties desired in a good functional fluid necessarily vary with the particular application in which it is to be utilized with each individual application requiring a functional fluid having a specific class of properties.

Of the foregoing, the use of functional fluids as lubricants, particularly aircraft engine lubricants, has posed a difficult area of application. Present design trends in aircraft engines are to the pure jet type or turbofan and away from the turboprop engine. Aside from the mechanical differences in design between the turbofan and turboprop engines, there is a significant difference in the properties of the lubricants required for these engines, primarily because of increased operating temperatures. Furthermore, even within the area of turbofan engine design alone, there is a trend to increase the temperature at which a lubricant must operate. Present temperature levels for turbofan lubricants are of the order of 400°–450°F. (bulk oil temperature). However, it is evident that within the near future, temperatures of the order of 500°F. or higher will be commonplace.

As the operating temperatures for lubricants have increased, it has become exceedingly difficult to find lubricants which properly function at these higher temperatures for any satisfactory length of time. Furthermore, it should always be realized that while the operating temperatures generally referred to are bulk oil temperatures, the actual temperatures at the points requiring lubrication exceed the bulk oil temperature and often times are one hundred to several hundred degrees higher.

In addition to the high temperature stability or durability problem, that is, the problem of finding a lubricant which will be thermally and oxidatively stable at temperatures as high as 500°F., the solution of this problem is further complicated by the fact that in order for a lubricant to be satisfactory for use in many aircraft engines, it must also be usable at temperatures as low as −20°F. to 0°F. It is, therefore, evident that present trends require lubricants having not only an exceedingly wide liquid range but lubricants which are also thermally and oxidatively stable at high temperatures. Furthermore, present and future lubricants must, of course, possess at least adequate temperature-viscosity properties and satisfactory lubricity, that is, the lubricants must not become too thin at the very high temperatures to which they are subjected nor must they become too thick at the lower temperatures and must at the same time be able to provide at least minimum lubricity over such range of temperatures. In general, such lubricants must also not be too volatile and even if somewhat volatile must not, upon evaporation, leave any significant deposits to interfere with the proper operation of engine bearings.

Other properties which must be possessed by satisfactory jet engine lubricants are low pour point and relatively high flash point and autogenous ignition temperatures.

Another lubricating problem associated with present-day design and design trends in jet engines is that the increased thrust needed to obtain high speeds and altitudes results in further increases in not only operating temperatures but also higher bearing pressures.

A further problem in obtaining a lubricant which has good combination of properties at various temperatures is that those materials having a low pour point also have a high evaporation rate at the temperatures of the order of 400°–500°F.

In summary, as discussed above, a satisfactory jet engine lubricant must possess a wide variety of properties. Furthermore, all of these properties are not only difficult to obtain in the same fluid but some of them tend to be mutually exclusive.

The most important properties for jet engine lubricants mentioned above are high temperature stability (thermal stability), high temperature oxidative stability and little or no corrosion toward metals. While fluids are known which possess adequate thermal and oxidative stability either inherently or can be provided by incorporating additives, many such functional fluids are corrosive to metals at high temperatures in the order of 500°F. and in particular to copper and silver. Although many additives, including organic nitrogen compounds, have been used in the past to reduce or eliminate the tendency of lubricants to corrode metals at lower temperatures, i.e., 100° to 350°F., at the higher temperatures referred to above the properties of additives become unpredictable. Many previously known metal corrosion inhibitors are not active at elevated temperatures and in many instances where they retain their corrosion inhibiting properties, they cause other problems such as decreased thermal and oxidative stability.

Additives useful in many different chemical types of functional fluids have now been discovered which reduce or eliminate the corrosiveness of the fluids toward metals at high temperatures.

It is, therefore, an object of this invention to provide functional fluid compositions which are substantially non-corrosive to metals. Another object of this invention is to provide functional fluid compositions which are substantially non-corrosive to metals at high temperatures. Another object of this invention is too provide additives for functional fluids which when added in a small amount to a base stock will reduce or eliminate the copper corrosivity of the fluid.

The objects mentioned above and others, which will hereinafter be apparent, are accomplished by adding to functional fluids, hereinafter described, corrosion reducing amounts of an organic nitrogen compound selected from the group consisting of A. a compound represented by the formula

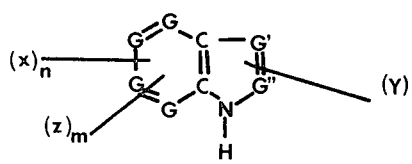

wherein X is selected from the group consisting of hydrogen, NH$_2$ and —OH, Y is selected from the group consisting of hydrogen, NH$_2$, OH and NHC ≡ N and G, G' and G'' are each selected from the group consisting of carbon and nitrogen provided that at least 1 of G' and G'' is carbon and at least 2 of G are carbon, Z is selected from the group consisting of hydrogen and a hydrocarbon group, $n$ is an integer from 1 to 2, $m$ is an integer from 1 to 2 and the sum of $m + n$ is equal to the number of G groups that are carbon B. a compound represented by the formula

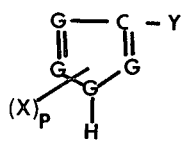

where G is selected from the group consisting of carbon and nitrogen provided that from 2 to 4 of G is nitrogen, X is selected from the group consisting of hydrogen, NH$_2$ and OH, and p is an integer from 0 to 2 and is no greater than the number of carbon atoms in the ring represented by G.

C. a compound represented by the formula

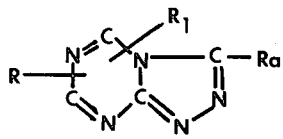

where each R, R$_1$ and R$_2$ are selected from the group consisting of hydrogen and NH$_2$ and D. a compound selected from the group consisting of cyanoamino hydroxy-pyrimidines, anilinopropionitriles, aminocarbazols, aminopyridines, aminonicotinic acids, cyanoglutaramides, aminonapthylimides and alkyldiimidazolines.

The hydrocarbon group, Z above, can be an aliphatic or aromatic hydrocarbon.

Preferred additives of this invention are compounds of A above represented by the formula

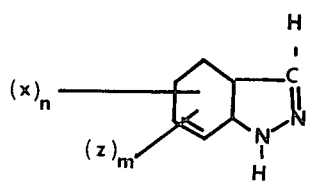

where X, Z, $n$ and $m$ have the same meaning as in A above.

Examples of compounds of formula I above are 4-aminoindazole, 5-aminoindazole, 6-aminoindazole, 7-aminoindazole, 4-hydroxyindazole, 5-hydroxyindazole, 6-hydroxyindazole and 7-hydroxyindazole. Such compounds are preferred additives of this invention because they are more soluble in the base stocks disclosed herein, particularly polyphenyl thioethers, and can be employed in small amounts to prevent or reduce metal corrosion. Particular compounds of A to D are presented in Table I hereinafter set forth.

The amount of the additives of this invention which are used in functional fluids vary according to the nature of the particular fluid to which they are added, i.e., the amount is proportional to the corrosivity of the fluid. Thus, the corrosivity of some fluids can be significantly reduced or eliminated by the addition of as little as about 0.025% by weight of the base stock of an additive of this invention. In general, an amount of up to about 5% by weight is adequate to achieve a substantially non-corrosive fluid. it is preferred to use from about 0.05% to about 0.5% by weight of an additive of this invention since within that range of concentrations the amount of additive used is low enough so that solubility considerations are not limiting yet adequate corrosion inhibition is obtained.

Because of the various considerations which go into the choice of the amount of additive used and also because of the differences existing between the many fluids in which the additives of this invention are active, the amount of additive to be used can be expressed as a "corrosion reducing amount", i.e., an amount which is effective to provide decreased corrosivity of the fluids contemplated.

Since many of the additives of this invention have limited solubility in some of the fluids hereinafter described, the improved compositions of this invention can be prepared by dissolving the additive in a small portion of the fluid at elevated temperatures in the range of from about 100°F. to about 200°F., then mixing the heated composition with the main portion of the fluid to form a composition of this invention.

The additives of this invention are particularly useful in polyphenyl thioethers, which as used herein, means a compound or physical mixture of compounds represented by the structures III 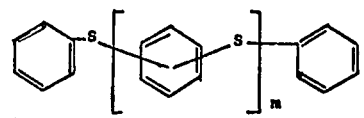

where $m$ is a whole number from 0 to 6,

IV 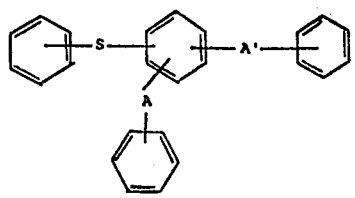

where A and A' are each selected from oxygen and sulfur,

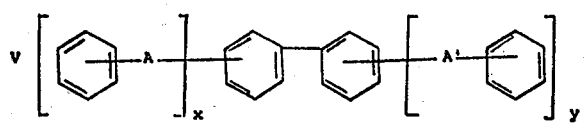

where x and y are whole numbers from 0 to 3 and the sum of $x + y$ is from 1 to 6 and A and A' are each selected from oxygen and sulfur but at least one of A and A' is sulfur, and

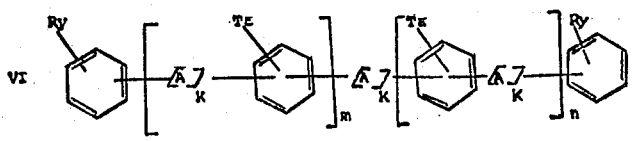

where R is selected from the group consisting of alkyl and alkoxy groups having from 1 to 4 carbon atoms, hydroxyl and hydrogen, T is selected from the group consisting of alkyl, haloalkyl and alkoxyl groups having from 1 to 4 carbon atoms, and hydroxyl, A is selected from the group consisting of oxygen and sulfur provided at least one A is sulfur, y, m and n are integers from 1 to 3 and K is an integer from 0 to 1 providing at least one K is 1.

Examples of such polyphenyl thioethers are:
2-Phenylmercapto-4'-phenoxydiphenyl sulfide,
2-Phenoxy-3'-phenylmercaptodiphenyl sulfide,
O-Bis(phenylmercapto)benzene,
Phenylmercaptobiphenyl,
Bis(phenylmercapto)biphenyl,
m-(m-chlorophenylmercapto)m-phenylmercapto benzene,
Phenylmercapto(phenoxy)biphenyl,
m-chlorodiphenyl sulfide,
Bis(O-phenylmercaptophenyl)sulfide,
m-Bis(m-phenylmercaptophenylmercapto)benzene,
1,2,3-Tris(phenylmercapto)benzene,
1-Phenylmercapto-2,3-bis(phenoxy)benzene,
O-Bis(O-phenylmercaptophenylmercapto)benzene,
m-Bis(p-phenylmercaptophenylmercapto)benzene,
2,2'-Bis(phenylmercapto)diphenyl ether,
3,4'-Bis(m-tolylmercapto)diphenyl ether,
3,3'-Bis(xylylmercapto)diphenyl ether,
3,4'-Bis(m-isopropylphenylmercapto)diphenyl ether,
3,4'-Bis(p-tert-butylphenylmercapto)diphenyl ether,
3,3'-Bis(m-chlorophenylmercapto)diphenyl ether,
3,3'-Bis(m-trifluoromethylphenylmercapto)diphenyl ether,
3,4'-Bis(m-perfluorobutylphenylmercapto)diphenyl ether,
and 2-m-Tolyloxy-2'-phenylmercaptodiphenyl sulfide.

Preferred compositions of this invention in which additives of this invention are advantageous are mixtures of m-bis(phenylmercapto)benzene and certain other materials which have properties that make them well suited for the uses disclosed above and particularly those applications, such as jet engine lubricants, requiring high temperatures, thermal and oxidative stability and wide liquid range. The other materials contemplated to be used with m-bis(phenylmercapto)benzene to provide such mixtures are as follows:

a. The three-, four-, five, and six-ring polyphenyl thioethers, for example, O-Bis(phenylmercapto)benzene

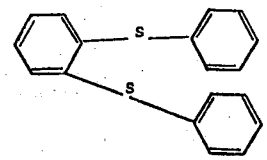

bis-(m-phenylmercaptophenyl) sulfide

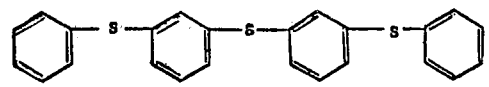

m-phenylmercaptophenyl-p-phenylmercaptophenyl sulfide.

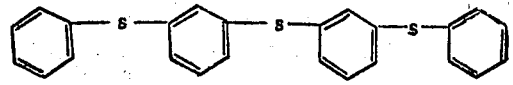

the trisphenylmercaptobenzenes,

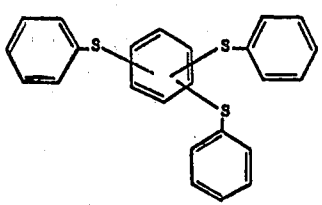

such as 1,2,4-trisphenylmercaptobenzene, 3,3'-bis(phenylmercapto)biphenyl

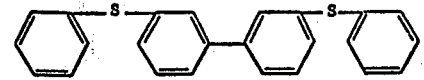

m-bis(p-phenylmercaptophenylmercapto)benzene,

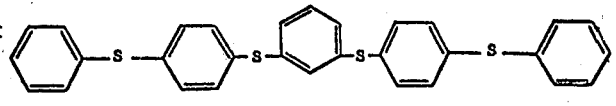

m-bis(m-phenylmercaptophenylmercapto)benzene

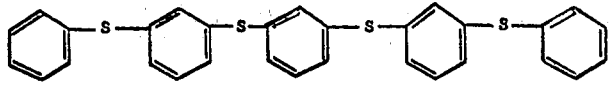

and bis[m-(m-phenylmercaptophenylmercapto)phenyl] sulfide

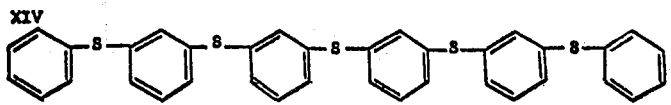

b. The mixed polyphenyl oxy-thioethers having the formula

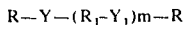

wherein R is a phenyl group, $R_1$ is a phenylene group and Y and $Y_1$ are each selected from the group consisting of oxygen and sulfur, providing at least one of Y and $Y_1$ is sulfur and $n$ is a whole number from 1 to 4. Examples of such mixed polyphenyl oxythioethers are m-phenylmercaptodiphenyl ether XV 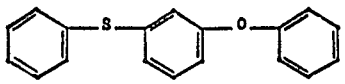

3,3'-bis(phenylmercapto)diphenyl ether,

XVI 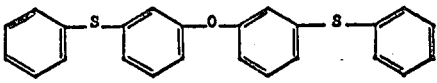

3,3'-bis(phenoxy))diphenyl sulfide,

XVII 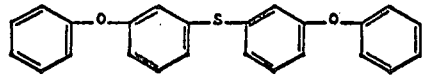

3-phenoxy-3'-phenylmercaptodiphenyl sulfide,

XVIII 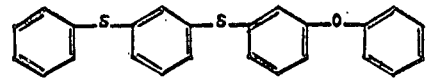

3-phenylmercapto-3'-phenoxydiphenyl ether,

XIX 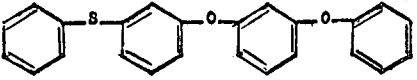

3,4'-bis(phenylmercapto)diphenyl ether,

XX 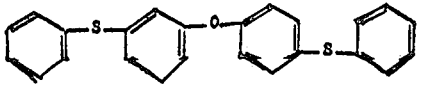

m-bis(m-phenylmercaptophenoxy)benzene,

XXI 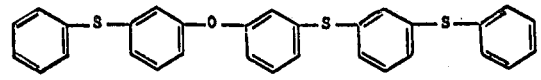

and 3-phenylmercapto-3'-(m-phenylmercaptophenylmercapto) diphenyl ether,

XXII 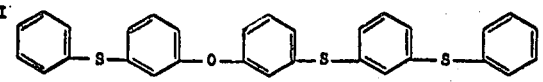

c. The four-, five- and six-ring polyphenyl ethers which can be represented by the structure XXIII 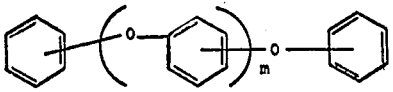

where $m$ is 2, 3, or 4 such as bis(m-phenoxyphenyl) ether, m-phenoxyphenyl p-phenoxyphenyl ether, m-bis(m-phenoxyphenoxy) benzene, m-[(m-phenoxyphenoxy) (p-phenoxyphenoxy)]benzene, p-[(p-phenoxyphenoxy)(m-phenoxyphenoxy)]benzene, p-bis(m-phenoxyphenoxy)benzene, m-bis(p-phenoxyphenoxy)benzene and o-bis(m-phenoxyphenoxy)benzene, by the structure XXIV 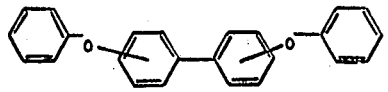

such as 3,3'-bisphenoxy biphenyl

XXV 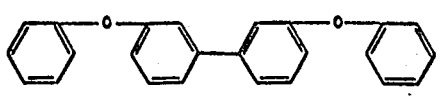

and by the structure

XXVI 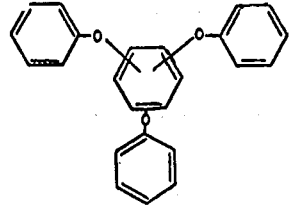

such as 1,3,4-triphenoxybenzene

XXVII 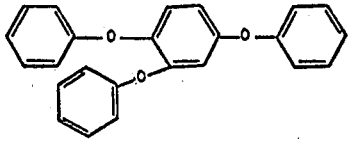

and mixtures and combinations of (a) through (c).

The compounds (a) through (c)) can be used alone or in combination to form compositions of this invention.

A typical mixture of polyphenyl thioethers is one which contains by weight from about 45 to about 55% m-phenoxyphenyl m-phenylmercaptophenyl sulfide, from about 25 to about 35% bis(m-phenylmercaptophenyl) sulfide and from about 18 to about 25% bis(m-phenoxyphenyl) sulfide. Particularly useful mixtures of polyphenyl thioethers are those containing the above mixtures and m-bis(phenylmercapto) benzene in about equal proportions. More particularly, examples of mixtures containing polyphenyl thioethers, mixed polyphenyl ethers, thioethers and halogenated polyphenyl ethers which are suitable as lubricants under high temperature conditions are as follows in weight percent:

1. 50% m-bis(phenylmercapto)benzene
   25% m-phenoxyphenyl-m-phenylmercaptophenyl sulfide
   11% bis(m-phenoxyphenyl)sulfide
   14% bis(m-phenylmercaptophenyl)sulfide
2. 50% m-bis(phenylmercapto)benzene
   25% m-phenoxy-m-phenylmercapto benzene
   25% O-bis(phenylmercapto)benzene
3. 46% m-(m-chlorophenylmercapto)-m-phenylmercapto benzene
   31% m-bis(phenylmercapto)benzene
   15% m-phenoxy-m-phenylmercapto benzene
   8% m-chlorodiphenyl sulfide It is also contemplated that any of the individual polyphenyl ethers described above or mixtures thereof in admixture with additives of this invention can also be utilized to provide compositions of this invention. For example, mixtures of polyphenyl ethers in which the non-terminal phenylene rings are linked through oxygen atoms in the meta and/or para positions, have been found to be particularly suitable. An example of such polyphenyl ether compositions are those containing, in percent by weight, from about 0 to 6% of O-bis(m-phenoxyphenoxy)benzene (1), about 40 to 85% of m-bis(m-phenoxyphenoxy) benzene (2), about 0 to 40% of m-[(m-phenoxyphenoxy) )p-phenoxyphenoxy)] benzene (3), about 0 to 12% of p-bis(m-phenoxyphenoxy) benzene (4), about 0 to 10% of p-[(p-phenoxyphenoxy) (m-phenoxyphenoxy)] benzene (5), and about 0 to 6% of m-bis(p-phenoxyphenoxy)-benzene (6). Typical compositions of such mixtures are listed below. The number of parentheses refers to the compound mentioned above having the same number thereafter.

TYPICAL COMPOSITIONS

| Component | Mixture % by weight of components | | | |
|---|---|---|---|---|
| | A | B | C | D |
| (1) | 0 | 6 | 5 | 4.5 |
| (2) | 63 | 82 | 80 | 43.5 |
| (3) | 31 | 0 | 4 | 40 |
| (4) | 0 | 12 | 11 | 4 |
| (5) | 0 | 0 | 0 | 8 |
| (6) | 6 | 0 | 0 | 0 |

The action of the additives of this invention has been found to be beneficial in a wide variety of synthetic functional fluids. Such fluids include synthetic ester base fluids. These are fluids of lubricating viscosity which are esters of alcohols containing at least 4 carbon atoms and which generally contain more than one ester group. They may be esters of polyhydric alcohols, of polybasic acids, or both.

Ester fluids with particularly advantageously low temperature viscosity properties, which flow readily at temperatures as low as −30°F., are provided by the diesters of dibasic acids. Ester lubricants of the dibasic acid ester type are illustrated by diester of long-chain dicarboxylic acids like azelaic acid with long-chain branched primary alcohols of the $C_4$ to $C_{10}$ range. The synthetic ester lubricants also include the esters of long-chain monobasic acids such as pelargonic acid with glycols such as polyethylene glycols. Complex esters are also formed by linking dibasic acid half esters through a glycol such as dipropylene glycol, a polyethylene glycol of 200 molecular weight, and so forth. Permutation and combination of these methods of forming polyester type lubricant fluids are valuable as well and also it is common practice to achieve desired properties in the ultimate base fluid by blending different polyester products. Simple esters providing suitable fluids can be exemplified, for example, by bis(2-methylbutyl) sebacate, bis(1-methylcyclohexylmethyl) sebacate, bis(2,2,4-trimethylpentyl) sebacate, dipropylene glycol dipelargonate, the diesters of acids such as sebacid, azelaic and adipic acid with complex $C_8$–$C_{10}$ primary branched chain alcohols such as those produced by the oxo process, polyethylene glycol 200 bis(2-ethylhexyl) sebacate, diisoamyl adipate, 1,6-hexamethylene glycol di(2-ethylhexanoate), bis(dimethylamyl) azelate and so forth.

Ester fluids with particularly good high temperature oxidation resistance are provided by neopentyl polyol esters. The alcohols from which these esters are derived have the carbon structure of neopentane, with a central carbon atom surrounded by 4 substituent carbon atoms. Included in the neopentyl polyols are neopentyl glycol, trimethylolethane, trimethylolpropane, pentaerythritol and dipantaerythritol. Generally, the base fluids comprising neopentyl polyol esters are the esters with monocarboxylic acids. Such esters are generally more oxidatively and thermally stable than the dibasic acid esters. The useful esters of the neopentyl polyols include, for example, the esters of trimethylol propane, neopentyl glycol, pentaerythritol and dipantaerythritol with normal, branched chain and mixed acids having the chain lengths varying from $C_2$ to $C_{12}$. Thus, an illustrative series of esters are trimethylolpropane tri-n-pelargonate, trimethylolpropane, tricaprate, trimethylolpropane tricaprylate, the trimethylolpropane triester of mixed octanoates, pentaerythrityl tetra butyrate, pentaerythrityl tetravalerate, pentaerythrityl tetracaproate, pentaerythrityl dibutyrate dicaproate, pentaerythrityl butyrate caproate divalerate, pentaerythrityl butyra trivalerate, pentaerythrityl butyrate tricaproate, pentaerythrityl tributyrate caproate and mixed tetraesters of $C_{2-10}$ fatty acids. Suitable dipentacrythrityl esters include dipentaerythrityl hexabutyrate, dipentaerythrityl hexapropionate, dipentaerythrityl hexavalerate, dipentaerythrityl hexacaproate, dipentaerythrityl hexaheptoate, dipentaerythrityl hexacaprylate, dipentaerythrityl tributyrate tricaproate, dipentaerythrityl trivalerate trinonylate and other dipentaerythrityl mixed hexaesters of $C_{2-10}$ fatty acids. Also, additives of this invention are useful in mixtures of mono- and dipentaerythritol esters of $C_{2-10}$ fatty acids and mixtures of $C_{2-10}$ fatty acids.

For further description of still other ester fluids adapted for use as lubricant base stocks and useful in the provision of the compositions of this invention, reference may be made, for example, to the discussion in Gunderson et al., "Synthetic Lubricants" (Reinhold, 1962).

Other compositions of this invention useful as functional fluids can be prepared by combining additives of this invention described above with mono- and dialkyl-thiophenes represented by the structural formula

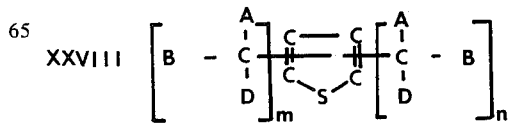

wherein A, B and D are each alkyl $C_{1-18}$ radicals and any two of A, B and D radicals together with the carbon atom to which they are attached can form an alicyclic ring and m and n are integers from 0 to 1, providing the sum of $m + n$ is at least one.

Typical thiophenes of structure XXVIII are as follows:
2,5-(1-hexyl-1-methylnonyl)thiophene,
2,4-(1-hexyl-1-methylnonyl)thiophene,
2-tert-butyl thiophene,
2,5-tert-butyl thiophene,
2,5-(1,1-dimethylpropyl)thiophene,
2,5-(1-butyl-1-octylnonyl)thiophene,
2,5-(1-propylcyclobutyl)thiophene,
2-tert-butyl-4-(1-octyl-1-methyloctadecyl)thiophene,
2,5-(1-methylcyclohexyl)thiophene,
2,5-(1-octyl-1-methyldecyl)thiophene,
2,5-(1,1-dimethyltridecyl)thiophene,
2,3-(1,1-dimethyltridecyl)thiophene,
2,4-(1,1-dimethyltridecyl)thiophene,
2,4-(1-methylcyclopentyl)thiophene, and
2,5-(1-n-dodecylopentyl)thiophene.

Other functional fluids in which the additives of this invention can be used are blended synthetic fluids comprising a major proportion of dihalogenated diphenyl ethers or sulfides and a minor amount of blended agents selected from halogenated lower alkyl benzenes, halogenated benzene, monohalogenated diphenyl ethers and chlorinated biphenyl or combinations thereof. The dihalogenated diphenyl ethers suitable for use as base stocks in the fluid compositions of this invention are those represented by the structure XXIX 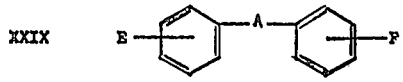

where A is a chalkogen having an atomic number of 8 to 16, E and F are bromine, chlorine and fluorine.

Typical examples of such ethers and sulfides are:
1. different halogen on each ring:
   2-bromo-2'-chlorodiphenyl ether,
   2-bromo-2'-chlorodiphenyl sulfide,
   2-bromo-3'-chlorodiphenyl ether,
   2-bromo-3'-chlorodiphenyl sulfide,
   2-bromo-4'-chlorodiphenyl ether,
   2-bromo-4'-chlorodiphenyl sulfide,
   3-bromo-2'-chlorodiphenyl ether,
   3-bromo-2'-chlorodiphenyl sulfide,
   3-bromo-3'-chlorodiphenyl ether,
   3-fluoro-3'-fluorodiphenyl sulfide,
   3-fluoro-4'-chlorodiphenyl ether,
   3-bromo-4'-fluorodiphenyl sulfide,
   4-fluoro-3'-fluorodiphenyl ether
   4-bromo-3'-chlorodiphenyl sulfide,
   4-bromo-4'-chlorodiphenyl ether,
   4-bromo-4'-chlorodiphenyl sulfide,
   4-bromo-2'-chlorodiphenyl ether, and
   4-bromo-2'-chlorodiphenyl sulfide
2. same halogen on each ring:
   2,2'-dibromodiphenyl ether,
   2,2'-dibromodiphenyl sulfide,
   2,3'-dibromophenyl ether,
   2,3'-dibromodiphenyl sulfide,
   2,4'-difluorodiphenyl ether,
   2,4'-difluorodiphenyl sulfide,
   3,3'-dibromodiphenyl ether,
   3,3'-dibromodiphenyl sulfide,
   3,4'-dibromodiphenyl ether,
   3,4'-dibromodiphenyl sulfide,
   4,4'-dibromodiphenyl ether,
   4,4'-dibromodiphenyl sulfide,
   2,2'-dichlorodiphenyl ether,
   2,2'-dichlorodiphenyl sulfide,
   2,3'-dichlorodiphenyl ether,
   2,3'-dichlorodiphenyl sulfide,
   2,4'-dichlorodiphenyl ether,
   2,4'-dichlorophenyl sulfide,
   3,3'-dichlorodiphenyl ether,
   3,3'-dichlorodiphenyl sulfide,
   3,4'-dichlorodiphenyl ether,
   3,4'-dichlorodiphenyl sulfide,
   4,4'-dichlorodiphenyl ether,
   4,4'-dichlorodiphenyl sulfide As used herein the term "major amount" of a fluid means that the amount of a particular fluid in a specific formulation is at least equal to the amount of any particular blending agent in said formulation. On the other hand the term "minor amount" of a blending agent means that the amount of a particular blending agent in a specific formulation is no more than the amount of any specific fluid in said formulation.

The ethers are generally preferred over the sulfides because their lower melting points make them usable in a wider number of applications and of the ethers, those in which the halogen substituents are in the 3,4'- relationship are preferred for use in the compositions of this invention, because their low melting points are the lowest of all the fluids of this invention.

The blending agents which can be used include the halogenated lower alkyl ($C_{2-4}$) benzenes containing 1 to 5 halogens, such as 4-bromomethylbenzene, 2-bromoethylbenzene, 4-bromopropylbenzene, 4-chlorobutylbenzene, 2,4-dichloromethylbenzene, 2,3-dibromoethylbenzene, 2,4-dibromoethylbenzene, 2,4-dichloroethylbenzene, 2-fluoro-4-chloroethylbenzene, 2,5-dibromoethylbenzene, 3,4-dibromoethylbenzene, 3,5-dibromopropylbenzene, 2,4-fluorobutylbenzene and the like. It is preferred to use the bromine-containing compounds because of the increased fire-resistance obtained thereby. Further examples of halogenated alkyl benzenes are tri- and tetra-chloroethylbenzene, tri- and tetrabromoethylbenzene, pentachloromethylbenzene, pentachloroethylbenzene, pentabromoethylbenzene, pentabromopropylbenzene, pentachlorobutylbenzene and the like.

In addition to the use of specific compounds, there can be used a mixture of halogenated alkyl benzenes such as the mixture of brominated ethyl benzenes disclosed in U.S. Pat. No. 2,257,903, which contain an average of two atoms of bromine per mol of ethyl benzene.

Other blending agents include the monohalogenated diphenyl ethers such as 2-chlorodiphenyl ether, 3-chlorodiphenyl ether, 4-chlorodiphenyl ether, 3-bromodiphenyl ether and the like and chlorinated biphenyl which is illustrated by the chlorinated biphenyl commercially available as products containing about 21, 32, 42, 48, 54 and 60% of combined chlorine corresponding approximately to mono-, di-, tri-, tetra-, penta- and hexachlorobiphenyl, respectively. The expression chlorinated biphenyl containing a stated percentage of combined chlorine is used herein as not only including these directly chlorinated products, but also as blends of one or more chlorinated biphenyl whereby the total chlorine content is broadly within the range of 20 to 60% preferably with the range of 20 to 42% by weight. It is also preferred, in order to obtain fluids having low crystallizing points, to use chlorinated biphenyl which has been isomerized, and preferably distilled thereafter according to the teachings of U.S. Pat. No. 3,068,297.

The halogenated benzenes which can be used as blending agents include chloro- and bromobenzenes. The preferred chlorobenzenes are di-, tri- and tetra-chlorobenzene and mixtures thereof. The preferred bromobenzenes are mono-, di- and tribromobenzene and more particularly m-dibromobenzene. Typical examples of halogenated benzenes useful as blending agents are o-dichlorobenzene, m-dichlorobenzene, 1,2,3-trichlorobenzene, 1,2,4-trichlorobenzene, 1,3,5-trichlorobenzene, 1,2,3,4-tetrachlorobenzene, 1,2,3,5-tetrachlorobenzene, o-dibromobenzene and 1,2,4-tribromobenzene.

Other blending agents which can be used are perhalogenated alkyl compounds such as hexachlorobutadiene.

Another class of functional fluids employed in preparing compositions of this invention are aliphatic hydrocarbon oils. Such oils are those obtained by super refining petroleum thereby producing a mixture of saturated aliphatic hydrocarbons or they can be produced synthetically. Preferred hydrocarbon oils useful in preparing compositions of this invention are those represented by the formula

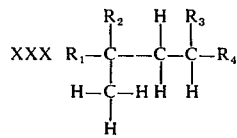

wherein $R_1$, $R_2$, $R_3$ and $R_4$ are saturated hydrocarbon radicals having a combined total of from 4 to 80 carbon atoms. The number of variations of the R groups in formula XXX is very large, and dependent thereupon is the viscosity range of any particular fluid. To list by name the many compounds contemplated by the above structure would unduly lengthen the present disclosure so therefore the following named compounds conforming to formula XXX are included herein only to point out the more commonly available and more desirable members of the class of compounds and in no way is such listing intented to exclude other compounds conforming to said formula. Such exemplary compounds are 2,2,4-trimethylpentane, 4,4,6-trimethylnonane, 7,9-dibutyl-7-methylpentadecane, 9,11-dihexyl-9-methylnonadecane, 11,13-dioctyl-11-methyltricosane, 13,15-didecyl-13-methylheptacosane, 15,17-didodecyl-15-methyldotriacontane, 4-ethyl-2,4-dimethylpentane, 4-butyl-4,6-dimethylnonane, 7-methyl-7-butyl-9-ethylpentadecane, 9-methyl-9-pentyl-11-propylnonadecane, 11-methyl-11-hexyl-13-tridecyltricosane, 13-methyl-13-heptadecyl-15-nonylheptacosane, 15-methyl-15-butyl-17-hexyldotriacontane.

One of the major bench scale methods used for evaluating the corrosivity of a lubricant or hydraulic fluid is the procedure given in MIL-L-9236A according to which the lubricant to be treated is heated at a specified temperature in the presence of certain metals and air and the corrosivity determined by measuring the change in weight of the metals.

Various compositions of this invention were tested according to the procedure of MIL-L-9236A except that the temperature was held at 500°F. instead of 600°F. The metal specimens used were, as specified in said procedure, steel, copper, silver, titanium, magnesium alloy and aluminum alloy. However, only the results upon copper and silver are reported since the compositions tested had essentially no effect on steel, titanium, magnesium alloy and aluminum alloy. The results observed using the above-described procedure are recorded in the tables below. The corrosivity to metals was determined by weighing the metal specimens before and after the test. The weight difference in milligrams per square centimeter of metal surface exposed to the fluid is reported.

To demonstrate the advantages of the anticorrosion activity of additives of this invention, various additives were added to a fluid designated as Fluid A. Fluid A was a mixture consisting by weight, of about 50% of m-bis(phenylmercapto)benzene, about 25% of m-phenoxyphenyl m-phenylmercaptophenyl sulfide, about 11% of bis(m-phenoxyphenyl) sulfide and about 14% of bis(m-phenylmercaptophenyl)sulfide. Table I below presents the data obtained by employing 0.1%, by weight, of each additive in Fluid A when the composition was subjected to the above-described test.

TABLE I

| Additive | Metal Weight Change Mg/cm$_2$ | |
|---|---|---|
| | Copper | Silver |
| None-Control (Average f 23 tests) | −2.39 | −.67 |
| 5-Aminoindazole | −.01 | −.39 |
| 6-Aminoindazole | −.01 | −.28 |
| 7-Aminoindazole | .00 | −.20 |
| 3-Amino-1,2,4-triazole | −.09 | −.56 |
| 3,5-Diamino-1,2,4-triazole | −.03 | −.13 |
| 5-Amino-4-carbamyl-3-pyrazoleacetic acid | −.01 | −.10 |
| 2,4-Dicyano-3-ethyl-3-methyl glutaramide | −.57 | −.59 |
| 4-Amino-1,8-naphthalimide | −.35 | −.53 |
| 2,2′-Octamethylene Di-2-imidazoline | −.04 | −.31 |
| Adenine-N-oxide | −1.02 | −.25 |
| 7-Amino-1-v-triazolo-(d)-pyrimidine | −.01 | −.22 |
| 5,7-Diamino-1,2,6,8-tetrazaindolizine | −.21 | −.02 |
| 5-Aminoindole | −1.04 | −.16 |
| 5-Hydroxyindole | −1.27 | −.27 |
| 3,6-Diaminocarbazol | −.04 | −.07 |
| 3,4-Diaminopyridine | −.05 | −.19 |
| 2-Aminonicotinic Acid | −.37 | −.39 |
| 7-Amino-s-triazolo(1,5-a)-pyrimidin-5-(4H)-one | −.44 | −.35 |
| 4-Methyl-1H-pyrazole(3,4-b)-pyridine-3,6-diol | −.22 | −.24 |
| 4-Aminopyrazolo(3,4-d)pyrimidine | −.58 | −.20 |
| 4,5-Diaminopyrimidine | −.39 | −.53 |
| 2,4,5-Triaminopyrimidine | −.04 | −.21 |
| 3-Amino-1-phenyl-2-pyrazolin-5-one | −1.41 | −.52 |
| 2-Cyano amino-4,6-dihydroxy-pyrimidine | −1.94 | −.29 |
| 4,6-Dihydroxypyrimidine | −1.22 | −.59 |
| 4-Aminopyrimido(4,5-d)pyrimidine | −.16 | −.05 |
| 3,5,7-Triamino-s-triazolo (4,3-a)-s-triazine | −.69 | −.25 |
| 5-Hydroxy-7-methyl-1,3,8-triazaindolizine | −1.64 | −.43 |
| *6-Hydroxyindozole | +.04 | +.30 |

*-.05% concentration

The data in Table I is to be compared with data presented in Table II below. The data in Table II was obtained from additional runs of the same test employing Fluid A containing 0.1% by weight of additives of very similar molecular structure to those listed in Table I.

TABLE II

| Additive | Metal Weight Change Mg/cm$_2$ | |
|---|---|---|
| | Copper | Silver |
| Control - from above | −2.39 | −.67 |
| 6-Aminouracil | −2.6 | −.74 |
| 5-Aminouracil | −3.1 | −.48 |
| 2,7-Dimercapto-4-hydroxypyrimido-(4,5-b)pyrimidine | −5.4 | −.81 |
| Benzimidazole | −3.7 | −1.2 |
| 2-Phenyl-4,6-bis(3-aminophenyl)-1,3,5-triazine | −2.8 | −.07 |
| 2-Mercaptopyrimidine | −4.4 | −1.5 |
| 4,6-Dihydroxy-2-mercapto-pyrimidine | −6.2 | −1.1 |
| 4-Amino-6-hydroxy-2-mercapto-pyrimidine | −6.2 | −.93 |
| 2-Amino-4,6-dihydroxypyrimidino | −3.4 | −.61 |
| 1-[3-(6-chloropyridazinyl)]-3-(3,4-dichlorophenyl)urea | −5.9 | −1.7 |
| 3-Methyl-5-phenyl pyrazole | −8.4 | −2.0 |
| 2-hydroxy-3,3'-4,4',5,6,hexachlorocarbanilide | −8.8 | −3.1 |
| (3,4-Dichlorophenylureido)-p-menthane | −3.0 | −.69 |
| 5-Nitroindazole | −8.4 | −1.4 |

A comparison of the results obtained in Tables I and II above indicates the selectivity required in solving the problem of metal corrosion by functional fluid at high temperatures by the incorporation of additives. Many additives which because of their structural similarity would be expected to reduce metal attack are found to increase it under the high temperature conditions for which the compositions of this invention are particularly useful.

In Table III below the results obtained using the above-described test are presented wherein Fluids are employed containing 5-aminoindazole, one of the preferred additives of this invention. Also included are the results obtained with different amounts of 5-aminoindazole employed in other fluids. The fluid designated Fluid B in Table III is a mixture consisting, by weight, of about 50% of m-phenoxyphenyl m-phenylmercaptophenyl sulfide, about 22% of bis(phenoxyphenyl)sulfide and about 28% of bis(m-phenylmercaptophenyl)-sulfide. The concentration of the additive is given in weight percent of the fluid and the copper attack is reported as weight change in milligrams per unit of surface area in contact with the fluid.

TABLE III

| Base Stock | Additive Concentration Wt. % | Copper Attack Mg/cm² |
|---|---|---|
| Penaerythritol tetraoctanoate | 0 | −6.70 |
| Pentaerythritol tetraoctanoate | .10 | −0.21 |
| Bis(phenylmercapto)benzene | 0 | −3.3 |
| Bis(phenylmercapto)benzene | .025 | −0.90 |
| Bis(phenylmercapto)benzene | .05 | +0.10 |
| Bis(phenylmercapto)benzene | .20 | −0.02 |
| Fluid B | 0 | −2.80 |
| Fluid B | .025 | −0.96 |
| Fluid B | .05 | +0.22 |
| Fluid B | .10 | +0.14 |

In accordance with the above data, it is evident that some of the fluids, particularly thioethers and mixtures of thioethers, when used as lubricants for gas turbine engines are outstanding with respect to high temperature stability and metal fluid compatibility when combined with additives of this invention. Thus, this invention relates to a novel method of lubricating gas turbine engines which comprises maintaining on the bearings and other points of wear of the engine a lubricating amount of a composition of this invention. Other fluids containing an additive of this invention useful as gas turbine engine lubricants are neopentyl polyol esters of $C_{2-18}$ fatty acids, mixtures of neopentyl polyol esters of $C_{2-18}$ fatty acids, dipentaerythritol ester of $C_{2-18}$ fatty acids and mixtures of the pentaerythritol esters and dipentaerythritol esters. Especially useful as gas turbine engine lubricants are mixtures of polyphenyl ethers and polyphenyl thioethers containing corrosion reducing amounts of an additive of this invention.

As a result of the excellent physical properties of the compositions particularly described above, improved hydraulic pressure devices can be prepared in accordance with this invention which comprise in combination a fluid chamber and an actuating fluid in said chamber, said fluid comprising a mixture of one or more of the base stocks hereinbefore described. In such a hydraulic apparatus wherein a movable member is actuated by the above-described functional fluids, performance characteristics are obtainable which are superior to those heretofore obtainable.

Because of the excellent fire-resistance of the compositions of this invention, their exceptionally low pour points, and good lubricity, the functional fluids of this invention can be utilized in those hydraulic systems wherein power must be transmitted and the frictional parts of the system lubricated by the hydraulic fluid utilized. Thus, the novel composition of this invention finds utility in the transmission of power in a hydraulic system having a pump therein supplying the power for the system. In such a system, the parts which are so lubricated include the frictional surfaces of the source of power, namely the pump, valves, operating pistons and cylinders, fluid motors and in some cases, for machine tools, the ways, table and slides. The hydraulic system may be of either the constant-volume or the variable-volume type of system.

The pumps may be of various types, including the piston-type pump, more particularly the variable-stroke piston pump, the variable-discharge or variable displacement piston pump, radial-piston pump, axial-piston pump, in which a pivoted cylinder block is adjusted at various angles with the piston assembly, for example, the Vickers Axial-Piston Pump, or in which the mechanism which drives the pistons is set at an angle adjustable with the cylinder block; gear-type pump, which may be spur, helical or herringbone gears, variations of internal gears, or a screw pump; or vane pumps. The valves may be stop valves, reversing valves, pilot valves, throttling valves, sequence valves or relief valves. Fluid motors are usually constant- or variable-discharge piston pumps caused to rotate by the pressure of the hydraulic fluid of the system with the power supplied by the pump power source. Such a hydraulic motor may be used in connection with a variable-discharge pump to form a variable-speed transmission.

Although the compositions described above are generally quite suitable for most applications, it may also be desirable to add small amounts of various other functional addition agents such as viscosity index improvers, e.g., a polymerized methacrylate ester, an alkylated polystyrene, or the polyether condensation products of ethylene oxide or propylene oxide, or both, with a glycol such as ethylene glycol, propylene glycol, butanediol, etc., or with an aliphatic alcohol such as butanol, octanol, decanol, tirdecanol, etc., pour point depressants, oxidation inhibitors, detergents, corrosion- and rust-inhibiting agents, anti-wear and lubricity agents, anti-foaming agents such as the silicone polymers, and the like.

While this invention has been described with respect to various specific examples and embodiments, it is to be understood that the invention is not limited thereto and that it can be variously practiced within the scope of the following claims.

The embodiments of this invention in which a particular property or privilege is claimed are defined as follows:

1. Composition comprising
   I. a major amount of a fluid of lubricating or hydraulic viscosity selected from the group consisting of
      i. polyphenyl thioethers,
      ii. mixed polyphenyl oxy-thioethers, and
      iii. admixtures thereof, and
   II. a corrosion inhibiting amount of 4-aminopyrazolo (3,4-d)pyrimidine.

2. Composition comprising
   I. a major amount of a fluid of lubricating or hydraulic viscosity selected from the group consisting of
      i. polyphenyl thioethers,
      ii. mixed polyphenyl oxy-thioethers, and
      iii. admixtures thereof, and
   II. a corrosion inhibiting amount of 7-amino-1-v-triazolo-(d)pyrimidine.

* * * * *

UNITED STATES PATENT OFFICE
CERTIFICATE OF CORRECTION

PATENT NO. : 3,939,084
DATED : February 17, 1976
INVENTOR(S) : James D. Sullivan It is certified that error appears in the above-identified patent and that said Letters Patent are hereby corrected as shown below:

Column 1, line 41, "temperature" should be -- temperatures --

Col. 2, line 59, "too" should be -- to --

Col. 3, line 34, " $\underline{X}$ " should be -- X --

Col. 3, lines 43 and 44, the last symbol of the formula structure reads "$R_a$" and should be -- $R_2$ --

Col. 3, the last formula structure should be identified -- I --

Col. 5, line 12, two occurrences of "$T_E$" in the structure identified "VI" should be -- $T_z$ --

Col. 10, line 22, "dipantaerythritol" should be -- dipentaerythritol --

Col. 10, line 38, "butyra" should be -- butyrate --

Col. 10, lines 49 and 50, "$C_{2-10}$" should be -- $C_{2-18}$ --

UNITED STATES PATENT OFFICE
CERTIFICATE OF CORRECTION

PATENT NO. : 3,939,084
DATED : February 17, 1976
INVENTOR(S) : James D. Sullivan It is certified that error appears in the above-identified patent and that said Letters Patent are hereby corrected as shown below:

Col. 11, line 29, "blended" should be -- blending --

Col. 14, Table I, 2nd line of contents reads
"(Average f 23 tests)" and should be
-- (Average of 23 tests) --

Col. 15, Table III, 1st line of contents reads
"Penaerythritol" and should be
-- Pentaerythritol --

Signed and Sealed this

Seventh Day of September 1976

[SEAL]

Attest:

RUTH C. MASON
Attesting Officer

C. MARSHALL DANN
Commissioner of Patents and Trademarks